US009883171B2

(12) United States Patent
de la Barré et al.

(10) Patent No.: US 9,883,171 B2
(45) Date of Patent: Jan. 30, 2018

(54) AUTOSTEREOSCOPIC SCREEN AND METHOD FOR THE SIMULTANEOUS REPRODUCTION OF MORE THAN TWO DIFFERENT PICTURES

(71) Applicant: Fraunhofer-Gesellschaft zur Foerderung der angewandten Forschung e.V., Munich (DE)

(72) Inventors: René de la Barré, Mittweida (DE); Silvio Jurk, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 365 days.

(21) Appl. No.: 14/420,662

(22) PCT Filed: Oct. 4, 2012

(86) PCT No.: PCT/EP2012/004220
§ 371 (c)(1),
(2) Date: Feb. 9, 2015

(87) PCT Pub. No.: WO2014/023321
PCT Pub. Date: Feb. 13, 2014

(65) Prior Publication Data
US 2015/0222885 A1    Aug. 6, 2015

(30) Foreign Application Priority Data

Aug. 10, 2012   (DE) .................. 10 2012 016 315

(51) Int. Cl.
*H04N 13/04*       (2006.01)
*G02B 26/00*       (2006.01)
*G02B 27/22*       (2006.01)

(52) U.S. Cl.
CPC ......... *H04N 13/0404* (2013.01); *G02B 26/00* (2013.01); *G02B 27/2214* (2013.01);
(Continued)

(58) Field of Classification Search
CPC ........... H04N 13/0404; H04N 13/0409; H04N 13/0415; H04N 13/0422; H04N 13/0447;
(Continued)

(56) References Cited

U.S. PATENT DOCUMENTS 5,493,427 A * 2/1996 Nomura ................ G02B 3/005
348/59
2010/0238275 A1   9/2010 Otte et al.
(Continued)

FOREIGN PATENT DOCUMENTS

CN    102156353 A    8/2011
CN    102257828 A    11/2011
(Continued)

OTHER PUBLICATIONS

International Search Report issued in PCT/EP2012/004220, dated Feb. 21, 2013, 5 pages.
International Preliminary Report on Patentability issued in PCTEP2012004220, completed Feb. 10, 2015, 7 pages.

*Primary Examiner* — Christopher Findley
(74) *Attorney, Agent, or Firm* — Faegre Baker Daniels LLP

(57) ABSTRACT

An autostereoscopic screen for the simultaneous reproduction of more than two different pictures, including a pixel matrix with a multitude of pixels, an optical element arranged on front of or behind the pixel matrix, and a control unit for activating the pixel matrix and the optical element. The optical element forms an optical grid with a family of strip-like structures which run next to one another, wherein a period length of the optical grid is changeable by way of activating the optical element. Thereby, for a change of a (Continued)

viewing distance ($L_n$, L; L') the control unit is configured to increase or reduce the period length and to simultaneously change a distribution of picture information onto the pixel matrix. The disclosure further relates to a corresponding method for the simultaneous reproduction of more than two different pictures.

17 Claims, 7 Drawing Sheets

(52) U.S. Cl.
CPC ..... *H04N 13/0409* (2013.01); *H04N 13/0415* (2013.01); *H04N 13/0422* (2013.01); *H04N 13/0447* (2013.01); *H04N 13/0475* (2013.01)

(58) Field of Classification Search
CPC . H04N 13/0475; G02B 26/00; G02B 27/2214
See application file for complete search history.

(56) References Cited

U.S. PATENT DOCUMENTS

| | | |
|---|---|---|
| 2011/0157497 A1 | 6/2011 | Kim |
| 2012/0027257 A1 | 2/2012 | Lee et al. |
| 2012/0044330 A1* | 2/2012 | Watanabe .......... G02B 27/2214 348/54 |
| 2012/0092763 A1* | 4/2012 | Song .................. G02B 27/2214 359/463 |
| 2012/0105748 A1* | 5/2012 | Huang .............. G02F 1/134309 349/15 |

FOREIGN PATENT DOCUMENTS

| | | |
|---|---|---|
| DE | 102010035626 A1 | 11/2011 |
| EP | 2413609 B1 | 2/2012 |
| JP | 2008185629 A | 8/2008 |
| JP | 2010282090 A | 12/2010 |
| JP | 2011101366 A | 5/2011 |
| JP | H0772445 A | 2/2015 |

\* cited by examiner

AUTOSTEREOSCOPIC SCREEN AND METHOD FOR THE SIMULTANEOUS REPRODUCTION OF MORE THAN TWO DIFFERENT PICTURES

CROSS-REFERENCE TO RELATED APPLICATIONS

This application is a national phase application of PCT Application No. PCT/EP2012/004220, internationally filed Oct. 4, 2012, which claims priority to German Application No. 10 2012 016 315.0, filed Aug. 10, 2012, all of which are herein incorporated by reference in their entirety.

TECHNICAL FIELD

This disclosure relates to autostereoscopic screens. In particular, this disclosure relates to autostereoscopic screens for the simultaneous reproduction of more than two different pictures.

BACKGROUND

Multi-view displays have been described for example in the document DE 10 2010 035 626 A1. With a correct use of these screens, in each case one of a number of stereoscopic half-pictures which corresponds to the mentioned plurality is reproduced on the mentioned subsets of pixels, of which half-pictures in each case two which are reproduced on subsets with directly adjacent bands, supplement one another in pairs into a stereo-picture. In this manner, not only can an individual viewer, but also several viewers placed next to one another in front of the screen can in each case perceive a three-dimensionally appearing picture of the same scene. Moreover, a viewer can move in the lateral direction in front of the screen, without losing the three-dimensional impression. Indeed he will see the same scene from a perspective which changes according to his movement.

The disadvantage with conventional multi-view displays however is the fact that the viewer or each of the viewers may only see a 3D-picture of adequate quality, if he maintains a nominal viewing distance to the screen with his eyes, wherein this nominal viewing distance is set by the geometric characteristics of the screen. Otherwise, each eye of the viewer, specifically in different regions of the screen, sees contributions and to some extent overlaps of different half-pictures.

SUMMARY

The disclosure describes, in some embodiments, an autostereoscopic screen, on which, from different distances which are freely selectable within as large as possible limits, one may see in each case a three-dimensionally acting picture of a reproduced scene, wherein it is to be possible for several viewers to look at the screen simultaneously and there to each see a three-dimensionally acting picture of the scene, and for a viewer to move laterally, without losing the three-dimensional impression. The disclosure describes, in some embodiments, a corresponding method for reproducing 3D-pictures on an autostereoscopic screen, which meets these demands.

In some screen embodiments, the screens include a pixel matrix with a multitude of pixels, an optical element arranged in front of or behind the pixel matrix, and a control unit for activating the pixel matrix, wherein the pixels of the pixel matrix are arranged in a multitude of parallel strips of pixels, the strips being vertical or inclined with respect to the vertical, and wherein the optical element forms an optical grid with a family of strip-like structures running next to one another in an equidistant manner parallel to the strips, said grid in each case setting a defined propagation direction for the light departing or transmitted by the pixels. Thereby, the control unit is configured to activate the pixel matrix in dependence on picture information of a plurality of stereoscopic half-pictures, such that each of these half-pictures is reproduced in each case on one of a corresponding number of subsets of pixels, wherein each of these subsets is formed by a family of bands of pixels which are each formed by one or more of the mentioned strips, wherein the bands of the different subsets cyclically alternate in the horizontal direction, so that each of the stereoscopic half-pictures is visible at a viewing distance in front of the screen, in each case from one of several laterally offset viewing zones.

This disclosure envisages a period length of the optical grid which is defined by the lateral offset of adjacent, strip-like structures of the optical grid, being changeable by way of activation of the optical element, wherein for this the optical element is also activatable by the control unit, additionally to the pixel matrix. Optical elements which may form optical grids with these characteristics are known per se, for example from the document US 2011/0157497 A1.

The control unit then according to the disclosure, for a change of the viewing distance, is configured to carry out the following steps:
  increasing or reducing the period length of the optical grid and
  redefining the mentioned subsets in a manner such that a width or an average width of the bands of pixels which form the subsets are changed by at least a width of one of the mentioned strips,
  wherein, in particular the redefining of the subsets—and thus the redistribution of picture information on the pixel matrix—is thereby effected such that a relative change of a lateral offset of the adjacent viewing zones is smaller than a relative change of the viewing distance. Thereby, the control unit of course does not need to be configured such that these two steps are carried out by it with each and every change of the viewing distance. What is rather meant is that of possibly as many as possible changes of the viewing distance, there is at least one defined change, with which the mentioned steps are carried out for adaptation.

The disclosure thus makes use of the fact that the optical characteristics of the screen which normally fix the nominal viewing distance, are no longer unchangeable on account of the special characteristics of the optical element serving as a grid and thus may be changed such that the screen with the respective correspondingly activated optical element is suitable for an observation form different viewing distances, with a simultaneous optimal utilisation of the pixels of the pixel matrix.

With this, decisive advantages are achieved compared to an adaptation to a changed viewing distance by way of simple redistribution of picture information on the pixel matrix, with a constant geometry of the screen, e.g. by way of increasing a lateral offset of the adjacent bands of pixels for reducing the viewing distance with an unchanged optical grid. Firstly, the bands of pixels which form the mentioned subsets, by way of a suitable grouping together of several strips, may in each case be selected so wide, that the viewing zones, from which the different stereoscopic half-pictures are visible in the respectively selected viewing distance, always have a width and a lateral offset with respect the respective adjacent viewing zones, which adequately accurately correspond to a distance between two pupils of an eye pair. For this reason, the disclosure envisages the width or the average width of the bands, with certain changes of the viewing distance, being changed by at least a width of one of the mentioned strips, by way of the number of strips per band being increased or reduced. By way of the fact that moreover the period length of the optical grid when required is increased or reduced, one may then succeed in the pixels of the pixel matrix, despite the change of the width of the bands of pixels which form the subsets, at least largely without remainders remaining unused, being able to be distributed at least approximately completely onto the subsets with the bands of a defined width and thus being able to be used for reproducing the half-pictures. By way of this, in each case a best possible picture sharpness and picture brightness result with a given pixel size and pixel number of the pixel matrix, a given viewing distance and a given number of reproduced half-pictures or viewing zones.

In some embodiments, the control unit is further configured, for the change of the viewing distance, to additionally increase or reduce the mentioned number of subsets and accordingly the plurality of reproduced, stereoscopic half-pictures, so that according to requirements, a width of a region which is spanned by the viewing zones and from which the reproduced screen is three-dimensionally visible, and/or a picture sharpness or picture resolution, may be selected adequately high.

With this disclosure, one also puts forward an correspondingly advantageous method for the simultaneous reproduction of more than two different pictures on an autostereoscopic screen which comprises a pixel matrix with a multitude of pixels and an optical element arranged in front or behind the pixel matrix, wherein the pixels of the pixel matrix are arranged such that they form a multitude of parallel strips of pixels with a vertical course or one which is inclined with respect to the vertical, and wherein the optical element forms an optical grid with a family of strip-like structures running equidistantly next to one another and parallel to the strips, said grid in each case setting a defined propagation direction for the light emitted or transmitted by the pixels, wherein a period length of the optical grid which is defined by a lateral offset of adjacent, strip-like structures is changeable by way of an activation of the optical element. With this method, the pixel matrix is activated in dependence on picture information of a plurality of stereoscopic half-pictures, in a manner such that each of these half-pictures is represented in each case on one of a corresponding number of subsets of pixels, wherein each of these subsets is formed by a family of bands of pixels which are formed in each case by one or more of the mentioned strips, wherein the bands of the different subsets cyclically alternate in the horizontal direction, so that each of the stereoscopic half-pictures at a viewing distance in front of the screen is visible in each case from one of several laterally offset viewing zones. The viewing distance with the suggested method is changed by way of increasing or reducing the period length of the optical grid and redefining the mentioned subsets in a manner such that a width or an average width of the bands of pixels which form the subsets is changed by at least a width of one of the mentioned strips, so that a relative change of a lateral offset of the adjacent viewing zones is smaller than a relative change of the viewing distance. Additionally, for changing the viewing distance, when required, the mentioned number of subsets and accordingly the plurality of reproduced stereoscopic half-pictures may be increased or reduced. This method in particular may be carried out with an autostereoscopic screen of the type described here.

It is useful if the control unit is configured to increase the width of the bands forming the subsets, for a reduction of the viewing distance, and to reduce it for an increase of the viewing distance—in any case when a certain threshold value is exceed or fallen short of by way of increasing or reducing the viewing distance, so that the width of the individual viewing zones and their lateral offset corresponds as accurately as possible to an average pupil distance, with all possible viewing distances. This is true if the optical element is arranged in front of the pixel matrix. The opposite applies if the optical element is arranged behind the pixel matrix. Accordingly, the suggested method envisages the viewing distance being reduced and for this the width of the bands forming the subsets being increased, or the viewing distance being increased and for this, the width of the bands forming the subsets being reduced. Instead, if the optical element is arranged behind the pixel matrix and not before the pixel matrix, the viewing distance may be reduced by reducing the width of the bands forming the subsets or the viewing distance may be increased by increasing the width of the bands forming the subsets.

In some embodiments, a screen which is particularly advantageous with regard to a best possible utilisation of all pixels of the pixel matrix, envisages the control unit being configured to thereby define the subsets in each case, such that all or a majority of the mentioned bands are formed in each case by an integer number of the mentioned strips of pixels, said number being the same for these bands, wherein the control unit is further configured to increase or reduce this integer number for the mentioned change of the viewing distance and thereby to change the period length of the optical grid by a factor which corresponds to a ratio of a product of the number of subsets and the mentioned integer number after the change, to the product of the number of subsets and the mentioned integer number before the change. Thereby, the control unit may be configured to define the subsets in each case such that for a number of bands of pixels which corresponds to the number of subsets, on average there is less than one strip of pixels which is assigned to none of the bands or contributes to a width of one of the bands which differs from a width of the majority of the bands.

In some embodiments of a method which is particularly usefully in the same regard, the subsets are thus defined in each case such that all or a majority of the mentioned bands are formed in each case by an integer number of the mentioned strips of pixels, said number being equal for these bands, and that this integer number is increased or decreased on changing the viewing distance and thereby the period length of the optical grid is changed by a factor which corresponds to a ratio of a product of the number of subsets and the mentioned integer number after changing the viewing distance, to the product of the number of subsets and the mentioned integer number before changing the viewing distance. Thereby, the subsets may in each case be defined such that for each number of bands of pixels which corresponds to the number of subsets, on average less than one strip of pixels which is assigned to none of the bands or contributes to a width of one of the bands which differs from a width of the majority of the bands, remains on the pixel matrix.

In order to permit such a change of the period length on redefining the subsets, the optical element for the activation may comprise a family of electrodes running parallel to the strips, wherein the control unit is then configured to activate the electrodes in each case with electrical command variables varying periodically from the left to the right, so that in each case a number of electrodes which corresponds to the product of the number of subsets and the mentioned integer number, forms a period. With regard to the command variable, it may thereby be the case e.g. of an electrical voltage. Thereby, the screen may be designed such that one of the electrodes is assigned to each of the mentioned strips of pixels, wherein a lateral offset of adjacent electrodes is smaller than a lateral offset of adjacent strips of pixels by a factor $L_n/(L_n+a)$, wherein a indicates a distance between the pixel matrix and the optical grid and $L_n$ a nominal viewing distance of the autostereoscopic screen. In this case, the pixels of the pixel matrix at least then may be distributed completely onto the subsets without any remainders, when the viewing distance corresponds to the nominal distance.

The autostereoscopic screen described in the disclosure may be realised in a particularly simple manner if the optical element is given by a liquid-crystal structure. The optical element may e.g. be a changeable lenticular lens, with which the mentioned strip-like structures may be given by cylindrical-lens-like lenses. The optical element may thus in particular be a liquid crystal lens system. In this case, the optical elements may also be activated such that a refractive force of the lenses is selected depending on the viewing distance, thus at least tend to be adapted to the viewing distance. However, other embodiments of the optical element are also conceivable, i.e. as changeable parallax barriers with alternating transparent and opaque strips, wherein such a parallax barriers with the desired changeability of the period length may also be realised in a particularly simple manner by way of liquid-crystal structures. The optical element may alternatively also be realised by a viscoelastic layer, i.e. of a gel which is deformable between electrodes, or by way of an electro-wetting structure.

Additionally, the autostereoscopic screen may comprise a device for detecting a distance of a viewer head or eye pair, to the screen. In this case, the control unit may be usefully configured to activate the pixel matrix and the optical element such that the viewing distance corresponds to the detected distance, and to carry out the mentioned steps when the viewing distance exceeds or falls short of a threshold value. An adaptation of the screen to changing viewing distances may thus be carried out automatically.

The control unit may also be configured to fix the viewing distance—under certain circumstances as an alternative to an automatic adaptation—in dependence on a manual input or in dependence on an input signal, and to carry out the mentioned steps, if by way of the input or the input signal, a change of the viewing distance is defined, by way of which the viewing distance exceeds or falls short of a threshold value.

The mentioned threshold value may e.g. be selected such that on approaching the screen, the width of the bands is increased exactly by one strip, when the width and the lateral offset of the viewing zones would otherwise be too small, in order to permit the viewer to have a lateral positioning, with which his pupils are located in the directly adjacent viewing zones.

For this, for at least an integer k≥1, one may envisage there being a threshold value $L_k$ which has the function outlined above and which is defined as $$L_k = L_n \times K^{-1} \times (1+v)/(k+1),$$

wherein the control unit is configured, on falling short of this threshold value $L_k$, to increase a number of strips of pixels, from which all or a majority of the mentioned bands are formed in each case, from k to k+1 and on exceeding this threshold valve $L_k$, to reduce the number of strips of pixels, from which all or a majority of the mentioned bands are formed in each case, from k+1 to k. Thereby, $L_n$ in the above definition of $L_k$ indicates a nominal viewing distance of the autostereoscopic screen, whilst K indicates a factor which is defined in that light departing from two adjacent strips of pixels, at the nominal viewing distance falls laterally offset by K×IPD through a viewing plane orientated parallel to the screen, whereby IPD is defines as the pupil distance of an average eye pair. Finally v indicates a parameter which has a value of between 0 and 1. Typically, it is the case that $0.3 \leq v \leq 0.7$.

It is possible that with a given viewing distance—be it by way of manual input or be it by way of the detection of a distance of a viewer to the screen—in some situations, with respect to an as good as possible resolution, it is more favourable to keep the number of viewing zones and thus the reproduced half-pictures smaller, and in contrast, in other situations—e.g. with a relatively large number of viewers—a larger number of viewing zones and reproduced half-pictures is more favourable, given the same viewing distance. Thereby, it may be helpful if the control unit is configured to fix the number if subsets and accordingly the plurality of reproduced stereoscopic half-pictures in dependence on a manual input or an input signal.

BRIEF DESCRIPTION OF THE DRAWINGS

Embodiments of the disclosure are hereinafter explained by way of the FIGS. 1 to 7. There are shown in FIG. 1 in a schematic representation, a view of an autostereoscopic screen and a viewing space in front of this screen, according to embodiments of the disclosure, FIG. 2 a detail of a pixel matrix of this screen in a frontal view, according to embodiments of the disclosure, FIG. 3 a greatly enlarged detail of a horizontal cross section through this screen, according to embodiments of the disclosure, FIG. 4 in a representation corresponding to FIG. 1, the same screen with a different activation, according to embodiments of the disclosure, FIG. 5 in a schematic representation, a view of another autostereoscopic screen of a similar type and a viewing space in front of this screen, according to embodiments of the disclosure, FIG. 6 in a representation corresponding to FIG. 2, a cross section through the screen of FIG. 5, according to embodiments of the disclosure, and FIG. 7 in a representation according to FIG. 5, the screen shown there with a different activation, according to embodiments of the disclosure.

DETAILED DESCRIPTION

Figure 1:
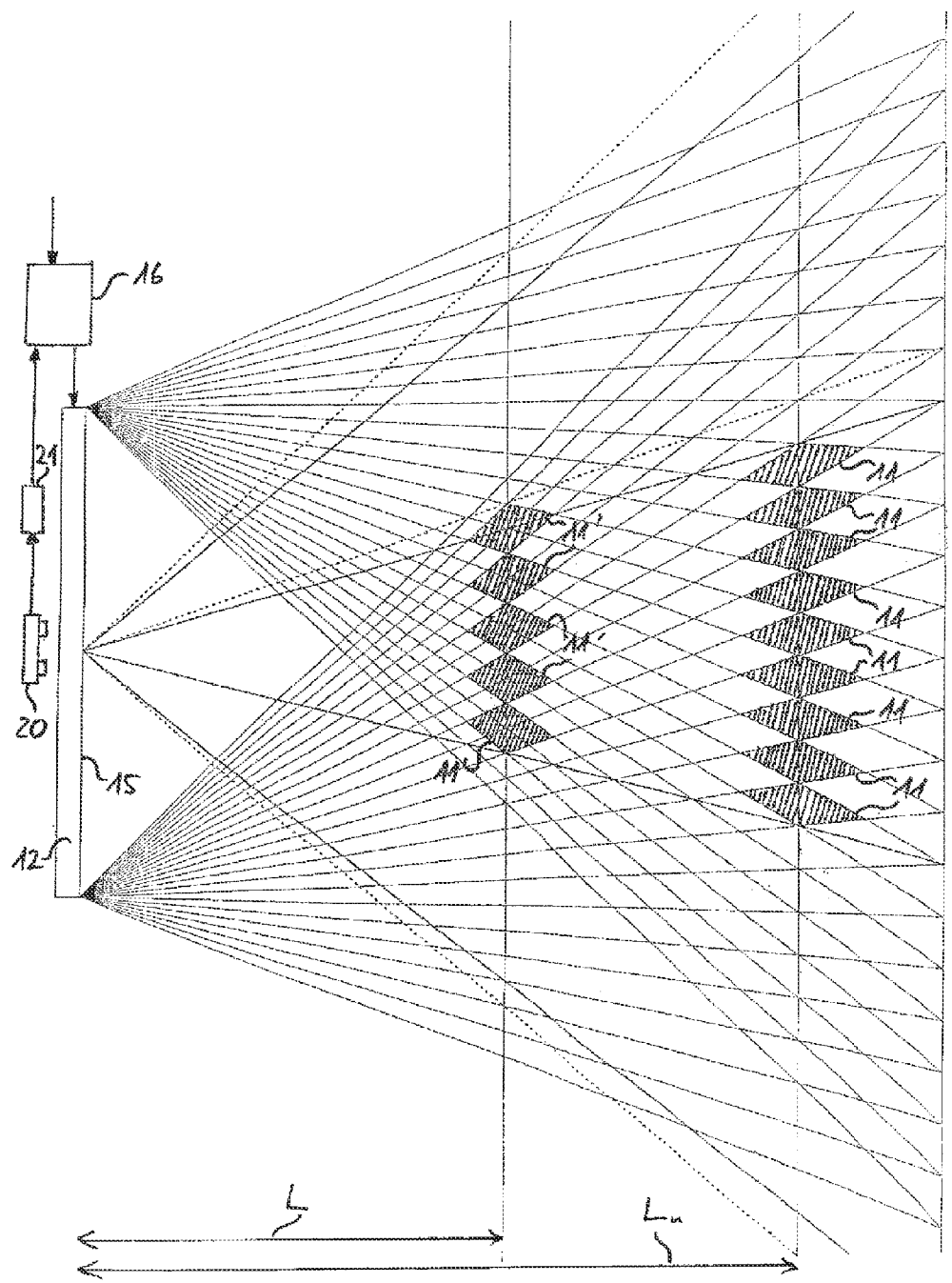

An autostereoscopic screen is shown in FIG. 1, with which it is the case of a multi-view display which is suitable for simultaneously reproducing more than two different pictures such that each of these pictures is visible from different, laterally offset viewing zones 11 and 11' respectively. This autostereoscopic screen comprises a pixel matrix 12 which may be given e.g. by a LCD.

Figure 2:
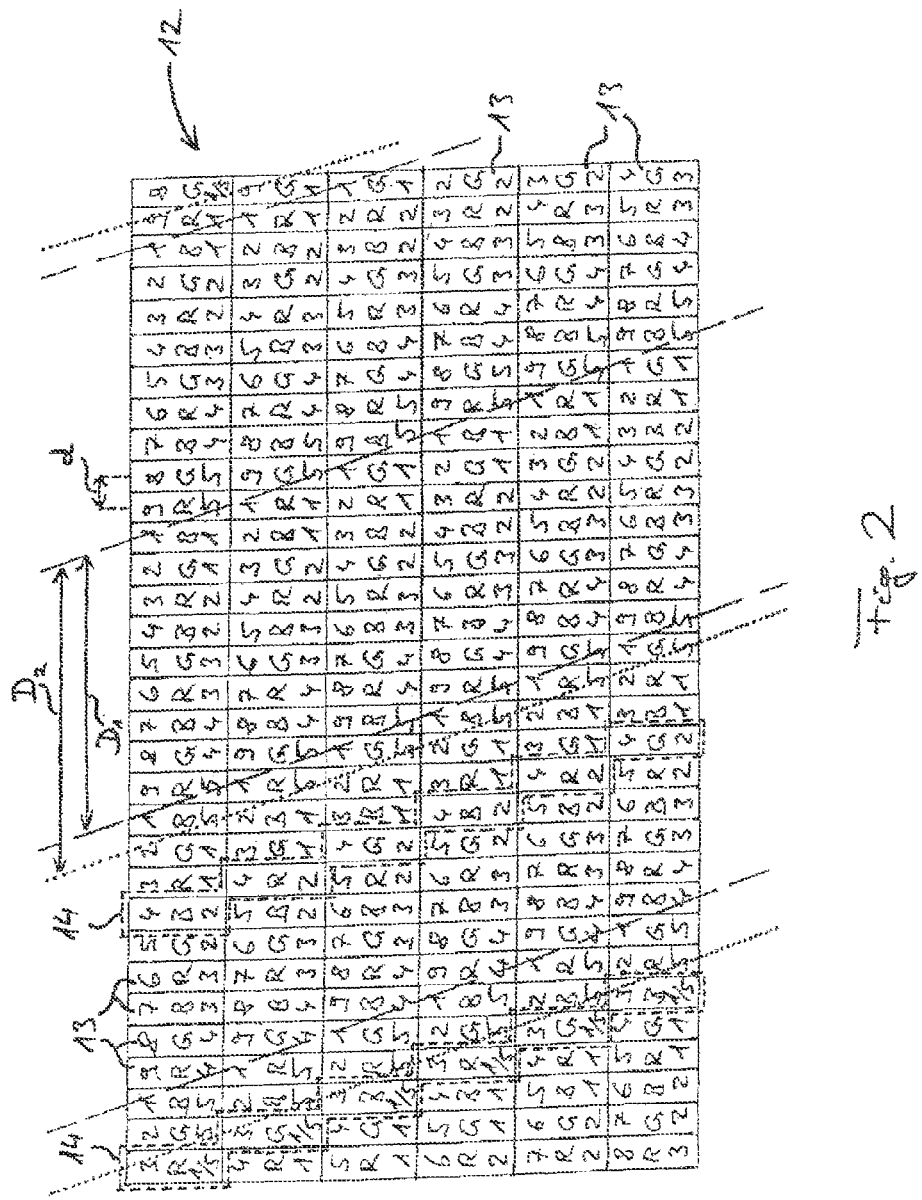

A detail of this pixel matrix 12 is shown in FIG. 2. It comprises a plurality of pixels 13 which are arranged in rows and columns, wherein, in some embodiments, pixels 13 of three basic colours red, green and blue cyclically alternate in the line direction in each case. The pixels 13 in FIG. 2 are characterised with one of the letters R for red, G for green and B for blue, depending on the respective basic colour. The pixels 13 of the pixel matrix 12 are arranged such that they form a multitude of parallel strips 14 of pixels 13, wherein these strips 14 have a width of in each case one pixel 13 and, in some embodiments, have a course which is inclined with respect to the columns of the pixel matrix 12, so that in each case pixels 13 of the three different basic colours cyclically alternate in the strip direction.

An optical element 15 is arranged on the front side of the autostereoscopic screen in front of the pixel matrix 12 and forms an optical grid with family of strip-like structures which run parallel to the mentioned strips 14 and are arranged equidistantly next to one another. By way of this, the optical grid formed by the optical element 15 in each case sets a defined propagation direction for the light which is emitted or transmitted by the pixels 13. Details of the optical element 15 are to be recognised in FIG. 3, wherein a detail of a horizontal cross section through the autostereoscopic screen of FIG. 1 is shown. Recurring features or ones which correspond to one another are provided in each case with the same reference numerals in all figures.

In some embodiments, the optical grid is a lenticular lens, and with the mentioned strip-like structures it is the case of cylindrical-lens-like lenses. Thereby, the optical element 15 is given by a liquid-crystal structure, so that in the present case it forms a liquid-crystal lens system. The result of this is that a period length of the optical grid which is defined by a lateral offset of adjacent, strip-like structures, thus in the present case by a lateral offset of adjacent cylindrical-lens-like lenses, may be changed by way of activating the optical element 15. Additionally, under certain circumstances, a refractive force of the lenses may also be adapted. For this, the autostereoscopic screen comprises a control unit 16, with which not only the optical element 15, but also the pixel matrix 12 is activated. Three different possible period lengths $D_1$, $D_2$, and $D_3$ which may be realised by way of suitable activation of the optical element 15, are drawn in FIG. 3. The cylindrical-lens-like lenses which are realised by the liquid-crystal structure are indicated there by unbroken, dashed and dotted lines respectively. For the two period lengths $D_1$ and $D_2$, the course and the width of the cylindrical-lens-like lenses are also drawn in FIG. 2, and specifically with dashed and dotted lines respectively, wherein this form of representation is not to imply that the lenses actually look like this, but merely to illustrate how the lenses realised first and foremost by refractive indexes varying in a location-dependent manner act. For activating the optical element 15 in a manner such that it forms the mentioned strip-like structures or cylindrical-lens-like lenses, the optical element 15 comprises a family of electrodes 17 running parallel to the mentioned strips of pixels. At least one further electrode 18 is provided on a transparent plate 19 which terminates the optical element 15 at a side lying opposite the strip-like electrodes 17. A liquid-crystal layer is arranged between the electrodes 17 and the at least one electrode 18, in which layer the cylindrical-lens-like lenses are formed, by way of the electrodes 17 being activated with voltages periodically varying from the left to the right—in FIG. 3 from the bottom to the top.

Various modifications are possible compared to the present embodiment example. Thus e.g. with a different arrangement of the pixels 13 and a correspondingly different orientation of the strip-like electrodes 17, the strips 14 of pixels as well as the strip-like structures formed by cylindrical-lens-like lenses in the described case, may under circumstances also have an exactly vertical course. With other embodiments, instead of a lenticular lens, a parallax barrier with a multitude of opaque strips arranged parallel to one another may serve as an optical grid. Also, such parallax barriers may be realised by a liquid-crystal structure, so that in this case too, a lateral offset of adjacent strip-like structures of the optical grid and thus the period length of the optical grid is changeable by way of suitable activation of the optical element 15. Finally embodiments with which the optical element 15 realised in a similar manner is not arranged in front of, but behind the pixel matrix 12 and there between the pixel matrix 12 and an illumination of the pixel matrix 12, in order to set a defined propagation direction in each case for the light transmitted by the pixels 13, are also conceivable.

The control unit 16 is configured to activate the pixel matrix 12 in dependence on picture information of a plurality of—in the present case up to nine—stereoscopic half-pictures, such that each of these half-pictures is reproduced in each case on a subset of a number of subsets of pixels 13, said number corresponding to this plurality. Thereby, each of these subsets is formed in each case by a family of bands of pixels 13, which in turn are formed in each case by one or also more of the previously mentioned strips 14 of pixels, wherein the bands of the different subsets cyclically alternate in the horizontal direction, so that each of the stereoscopic half-pictures at a viewing distance $L_n$ or L in front of the screen, is visible from in each case one of the already previously mentioned viewing zones 11 and 11' respectively, which are represented hatched in FIG. 1. Additionally to these viewing zones 11 and 11', there may be further auxiliary zones lying next to these, in which likewise one of the half-pictures is visible in each case, but which is of no concern here.

As to how the mentioned subsets of pixels 13 or the bands of pixels 13 which form these subsets are defined in detail, depends on which of the different possible viewing distances, for example the so-called nominal viewing distance $L_n$ or the viewing distance L which is different from this and in the present case is selected shorter, the screen is to be activated for. Thereby, with certain changes of the viewing distance, one envisages also changing the period length of the optical grid by way of a suitable activation of the optical element 15, in order to ensure that the different stereoscopic half-pictures are visible in each case from the correct viewing zone 11 and 11' respectively. For this reason, the control unit 16, for certain changes of the viewing distance L, is configured to increase or reduce the period length of the optical grid and to simultaneously redefine the mentioned subsets such that thereby a width or an average width of the bands of pixels 13 which form the subsets is changed by at least a width of one of the strips 14. Thereby, the width of the bands forming the subsets is increased from the width of a strip 14 to a width of two strips 14 for a reduction of the viewing distance from $L_n$ to L and is reduced to a width of each case only one of the strips 14 for an increase of the viewing distance from L to $L_n$. The result of this is that a relative change of a width of the viewing zones 11 and 11' and accordingly of a lateral offset of the adjacent viewing zones 11 and 11' respectively, is smaller than a relative change of the viewing distance—in the present case from $L_n$ to L or from L to $L_n$—, if the activation of the screen is changed in the described manner. Thereby, at least in the presently described case, for the change of the viewing distance, additionally also the number of subsets and accordingly the plurality of the reproduced stereoscopic half-pictures is reduced or increased and specifically from nine to five, when the viewing distance is shortened from $L_n$ to $L$, and from five to nine when the viewing distance is increased from $L$ to $L_n$.

Figure 3:
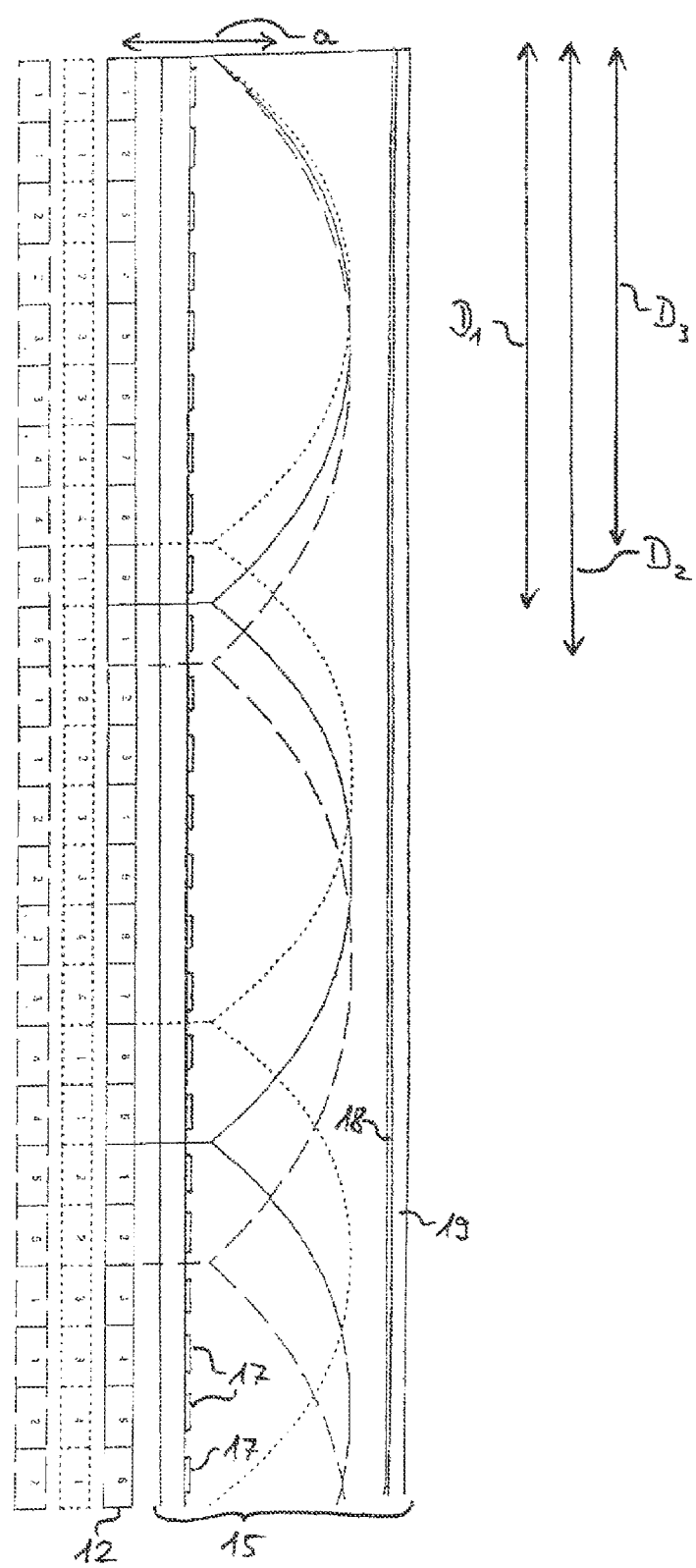

Whilst FIG. 1 illustrates as how the light departing from the different pixels 13 of the pixel matrix 12 is guided by the optical grid of the optical element 15 into a viewing space in form of the screen such that there the mentioned viewing zones 11 and 11' arise there as regions, from which in each case only one of the different stereoscopic half-pictures is visible, FIGS. 2 and 3 illustrate in detail how the activation of the pixel matrix 12 and of the optical element 15 is changed, in order to change the viewing distance from $L_n$ to $L$ and from $L$ to $L_n$ respectively.

For viewing the screen from the nominal viewing distance $L_n$, in the present case nine stereoscopic half-pictures are reproduced accordingly on nine subsets of the pixel matrix 12. The subsets are thereby number through from 1 to 9, wherein the pixels 13 in FIG. 2 in each case in the upper region of the respective pixel are provided with a number which corresponds to the number of the subset, to which this pixel 13 belongs. As is to be deduced in FIG. 2, the bands of pixels 13 which form the nine different subsets, in this case are formed in each case by exactly one of the strips 14, thus have a width of exactly one strip 14. The optical element 15 in this case is activated such that the lenticular lens formed by way of this has a period length $D_1$ which corresponds extremely accurately to nine-fold a lateral offset d of adjacent strips 14 of pixels 13. Actually, the period length $D_1$ is slightly smaller, so that $D_1=9\times L_n/(L_n+a)$, wherein a indicates an effective distance between the pixel matrix 12 and the optical grid. The factor $L_n/(L_n+a)$ thereby differs only so slightly from 1, that the deviation of the period length $D_1$ from nine-fold the mentioned lateral offset d is not recognisable in the FIGS. 2 and 3. The electrodes 17 in this case are activated with voltages varying periodically from the left to the right, such that in each case nine of the electrodes 17 form a period, so that thus every ninth electrode 17 is subjected in each case to the same voltage. The electrodes 17 are arranged such that exactly one of the electrodes 17 is assigned to each of the strips 14 of pixels 13, wherein a lateral offset of adjacent electrodes by the already mentioned factor $L_n/(L_n+a)$ is smaller than the lateral offset d of adjacent strips of pixels 13, so that the desired period length $D_1$ results with the described activation of the optical element 15.

In order to now adapt the activation of the screen such that one or several viewers may see a stereopicture composed in each case of two of the stereoscopic half-pictures, from the shorter viewing distance $L$ instead of the nominal viewing distance $L_n$, the number of subsets is reduced from nine to in the present example five, wherein the subsets are simultaneously redefined such that in each case two of the strips 14 are grouped together, in order to form one of the bands. All or at least the majority of the bands are now therefore formed by in each case two of the strips 14 of pixels. In this case too, the subsets are numbered through, and specifically now from 1 to 15, wherein in FIG. 2 the pixels 13 in a lower region of the respective pixel 13 are each provided with a number which corresponds to the number of the subset, to which this pixel 13 is assigned with this alternative activation.

In order to permit a distribution of the pixels 13 of the pixel matrix 12 onto five subsets, which each have width of at least two pixels 13, but at the same time to permit as best as possible utilisation of the pixels 13 of the pixel matrix 12 and finally to ensure that light departing from the pixels 13 of a certain subgroup is also precisely guided into the viewing zone 11' assigned to this subset, the period length of the optical grid with the described change of the activation is increased from $D_1$ to $D_2$, wherein $D_2=10\times L_n/(L_n+a)=(10/9)\times D_1$. For this, the number of electrodes 17 which with respect to their activation with different voltages forms a period, is increased from nine to ten. FIG. 3 illustrates how, by way of this, the lenticular lens is changed such that the cylindrical-lens-like lenses drawn there with dashed lines occur at the location of the cylindrical-lens-like lenses drawn there with unbroken lines. In FIG. 3 too, the pixels 12 are also provided in each with a number which corresponds to the number of the subset, to which the respective pixel 13 is assigned. Apart from the line of pixels 33 shown in FIG. 2, in a corresponding manner the same line is shown one again the very left by dashed lines, wherein the numbers plotted there represent the numbers of the subgroups, to which the respective pixels are assigned with the activation for the shorter viewing distance.

The picture information of the now only five stereoscopic half-pictures must moreover be written into the pixel matrix 12 in a slightly spread manner in the lateral direction, in order to ensure that the viewing zones 11' with this activation arise at the viewing distance $L$ in front of the screen which is smaller compared to the nominal viewing distance $L_n$. By way of this, individual strips 14 of pixels are left over at a few locations and may either be scanned darkly or added to one of the bands of pixels 13, which by way of this exceptionally obtain a width of three pixels 13 instead of only two pixels 13. The pixels 13 of these particular strips 14 in the lower region in FIG. 2 are each characterised by 1/5, in order to illustrate that these pixels 13 may be assigned to the first subgroup or to the fifth subgroup. Even when taking these exceptions into account, the subsets in any case are each defined by the suitably programmed control unit 16 in each case such that either all or a majority of the mentioned bands of pixels 13 are formed in each case by an integer number which is the same for these bands—in the present case one for the nominal viewing distance $L_n$ and two for the shorter viewing distance $L$—of the mentioned strips 14. Thereby, this integer number is increased or reduced in the described manner, for the change of the viewing distance—in the present case from one to two or from two to one—and thereby the period length of the optical grid is changed by a factor which corresponds to a ratio of a product of the number of subsets and the mentioned integer number after the change—in the present case ten—to the product of the number of subsets and the mentioned integer number before the change—in the present case nine. In the case of a shortening of the viewing distance from $L_n$ to $L$ which is described here, this factor is 10/9, which results from that which has been previously said and from the general rule formulated here. Thereby, the control unit 16 in each case defines the subsets such that for a number of bands which corresponds to the number of subsets, there is on average less than one strip 14 which is assigned to none of the bands or contributes to a width of one of these bands which differs from a width of the majority of the bands. In the present case this for the detail shown in FIG. 2, specifically in the case of the viewing distance $L$, is only shown for the strips 14 whose pixels are characterised with 1/5 in their lower region, whilst in the case of the nominal viewing distance $L_n$, there are no strips 14 at all which are assigned to none of the bands or contribute to a width of one of the bands which differs from the width of the majority of the bands.

The widening of the bands with a shortening of the viewing distance has the purpose of preventing the viewing zones 11 and 11' from becoming too narrow. Of course, the screen can also be activated for viewing distances which differ from L and $L_n$ and for example lie between L and $L_n$. An adaptation to such differing viewing distances may thereby be effected in each case by the suitably programmed control unit 16, by way of the picture information being written into the pixel matrix 12 in a manner spread to a greater or lesser extent, so that the number of strips 14 which are assigned to none of the bands or contribute to a width of one of the bands which differs from a width of the majority of the bands, becomes slightly larger or smaller. As to whether thereby it makes sense to rather activate the screen, disregarding the correspondingly dosed lateral spreading, as if the viewing distance corresponds to the nominal viewing distance $L_n$, or whether it would make more sense to activate the screen rather is in the case of the viewing distance L, depends on the whether the viewing distance exceed or falls short of a certain threshold value. In the present case, one would define the threshold value $L_1$, falling short of which the number of strips 14 per band is increased from one to two or exceeding which the number of strips 14 per band is reduced from two to one, as $L_1=L_n\times(1+v)/2$, wherein v indicates a parameter which has a value between 0 and 1 and usefully is selected such that $0.3 \leq v \leq 0.7$. In a similar manner, one may define other threshold values $L_k$ for the viewing distance, with which a similar change of the activation of the pixel matrix 12 as well as of the optical element 15 is effected, by way of increasing the number of strips 14, from which all or a majority of the mentioned bands are formed in each case, from k to k+1 on falling short of this threshold value $L_k$, and reducing the number of strips 14 from which all or a majority of the mentioned bands are formed in each case, from k+1 to k, on exceeding this threshold value $L_k$. With the screen of FIG. 1, these threshold values $L_k$ are usefully defined as $L_k=L_n\times(1+v)/(k+1)$. More generally $L_k=L_n\times K^{-1}\times(1+v)/(k+1)$, wherein K indicates a factor which is defined in that light departing from two adjacent strips 14 of pixels 13 at the nominal viewing distance $L_n$ falls laterally offset by K-times a pupil distance of an average eye pair, through a viewing plane orientated parallel to the screen. Thereby, as a rule, one may assume 65 mm as the pupil distance of an average eye pair, if the screen is to be designed for a viewing by adult people. In the present example K=1, but other embodiments with differing values of this factor are also conceivable. Thus e.g. K=0.5 for the embodiment examples described further below by way of FIGS. 5 to 7.

The control unit 16 for this may be configured to fix the viewing distance, for which the screen is then activated, in dependence on a manual input or an input signal, and to always carry out the redefinition of the subsets and change of the period length of the optical grid, which have been described here in detail, if, by way of the input or the input signal, a change of the viewing distance is defined, by way of which the viewing distance exceeds or falls short of the threshold value $L_1$ or one of the threshold values $L_k$. In order to permit an automated adaptation of the activation to a changing viewing distance, the screen comprises a device shown schematically in FIG. 1, for detecting a distance of a viewer head or of an eye pair, to the screen. This device comprises a stereo-camera 20 which is arranged above the pixel matrix 12 and is directed onto the viewer space in front of the screen, and an evaluation unit 21 which evaluates pictures taken by the stereo-camera 20, with the aid of picture recognition algorithms. The thus detected distance of the viewer head or of the eye pair, to the screen, is then transferred to the control unit 16 which is configured to activate the pixel matrix 12 and the optical element 15 such that the viewing distance corresponds to the detected distance. The detected distance in this case corresponds to the previously mentioned input signal, so that the control unit 16 automatically carries out the change of the definition of the mentioned subsets and the change of the activation of the optical element 15, when the detected distance exceeds or falls short of the threshold value $L_1$ or one of the threshold values $L_k$.

Figure 4:
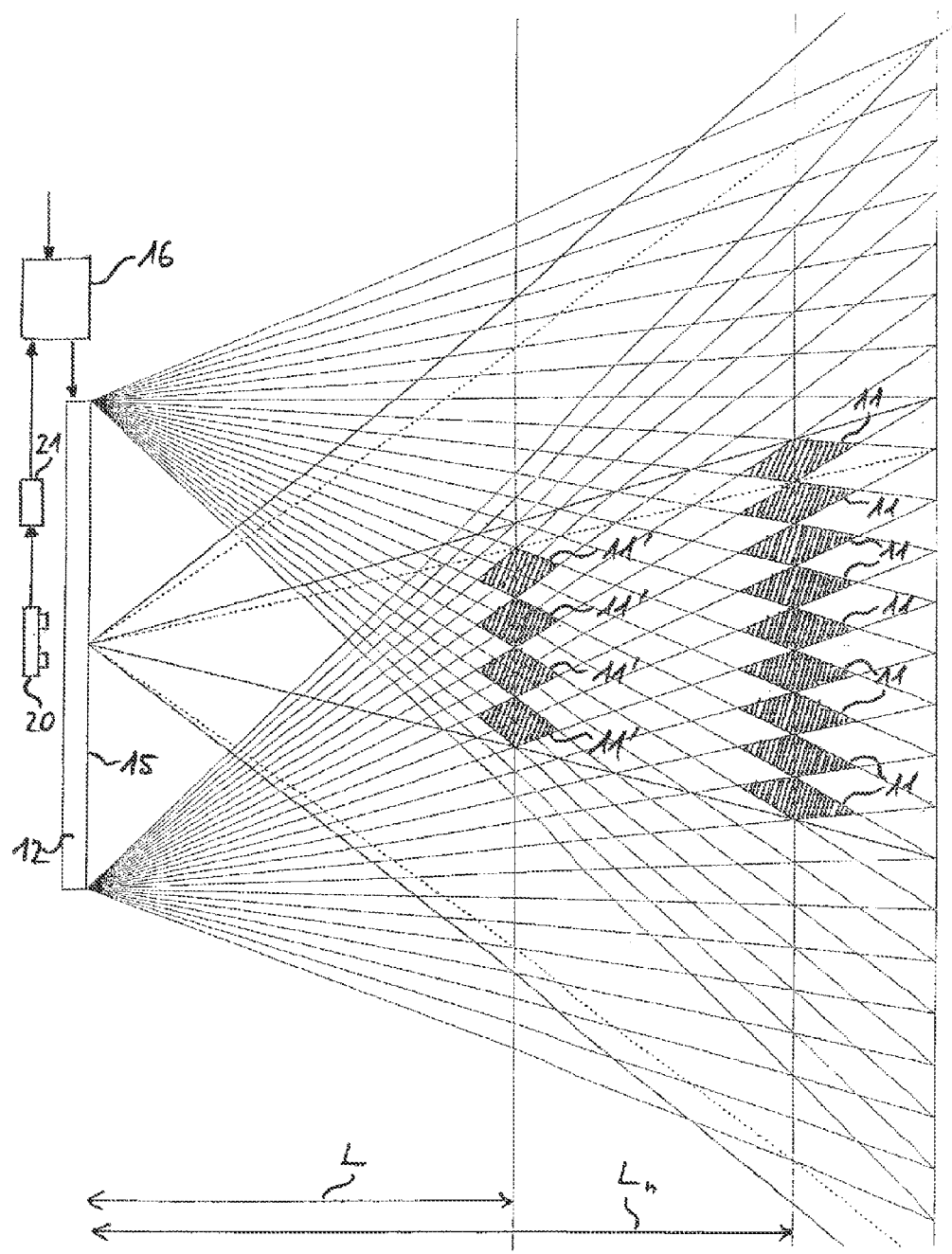

In some situations, it may be favourable if the space spanned by the viewing zones 11 and 11' is as wide as possible, so that as many as possible viewers may see the scene reproduced by the stereoscopic half-pictures or with this, the viewer or viewers have an as large as possible lateral freedom of movement. In other situations, in particular if only one viewer or an extremely small number of viewers is placed in front of the screen, it may in turn be advantageous to keep the space spanned by the viewing zones 11 and 11' narrower, since by way of this, one may realise a higher resolution and thus a sharper picture. With regard to this too, the presently described screen permits an adaptation to different requirements. Thus a width of the region spanned by the viewing zones 11 and 11' may be increased, by way of the period length of the optical grid being increased and accordingly also the number of subsets of pixels 13, on which in each case one of the half-pictures is reproduced, being increased. This is effected at the cost of a resolution or picture sharpness which reduces with the increase of the period length of the optical grid. On the other hand, the width of the region spanned by the viewing zones 11 and 11' may be reduced. An example embodiment of this is shown in FIG. 4, in which the same screen is to be seen as in FIG. 1. The screen with the shorter viewing distance L in this case is activated such that only four stereoscopic half-pictures are reproduced on accordingly only four subsets of pixels, in order to avoid too small a picture sharpness on approaching the screen, wherein the optical element 15 is then activated such that the optical grid has a shorter period length $D_3$, for which $D_3=(8/9)\times D1$. The lenticular lens and the corresponding activation of the pixels 13 of the pixel matrix 12 for this case are drawn with dotted lines in FIG. 3.

In order to permit an activation of the screen which is optimal for the respective situation, also with regard to the number of subsets and the width of the region spanned by the viewing zones 11 and 11', the control unit 16 is configured to fix the number of subsets and accordingly the plurality of the reproduced stereoscopic half-pictures, in dependence on a manual input or an input signal, so that the width of the mentioned region is freely selectable at least within certain limits.

Figure 5:
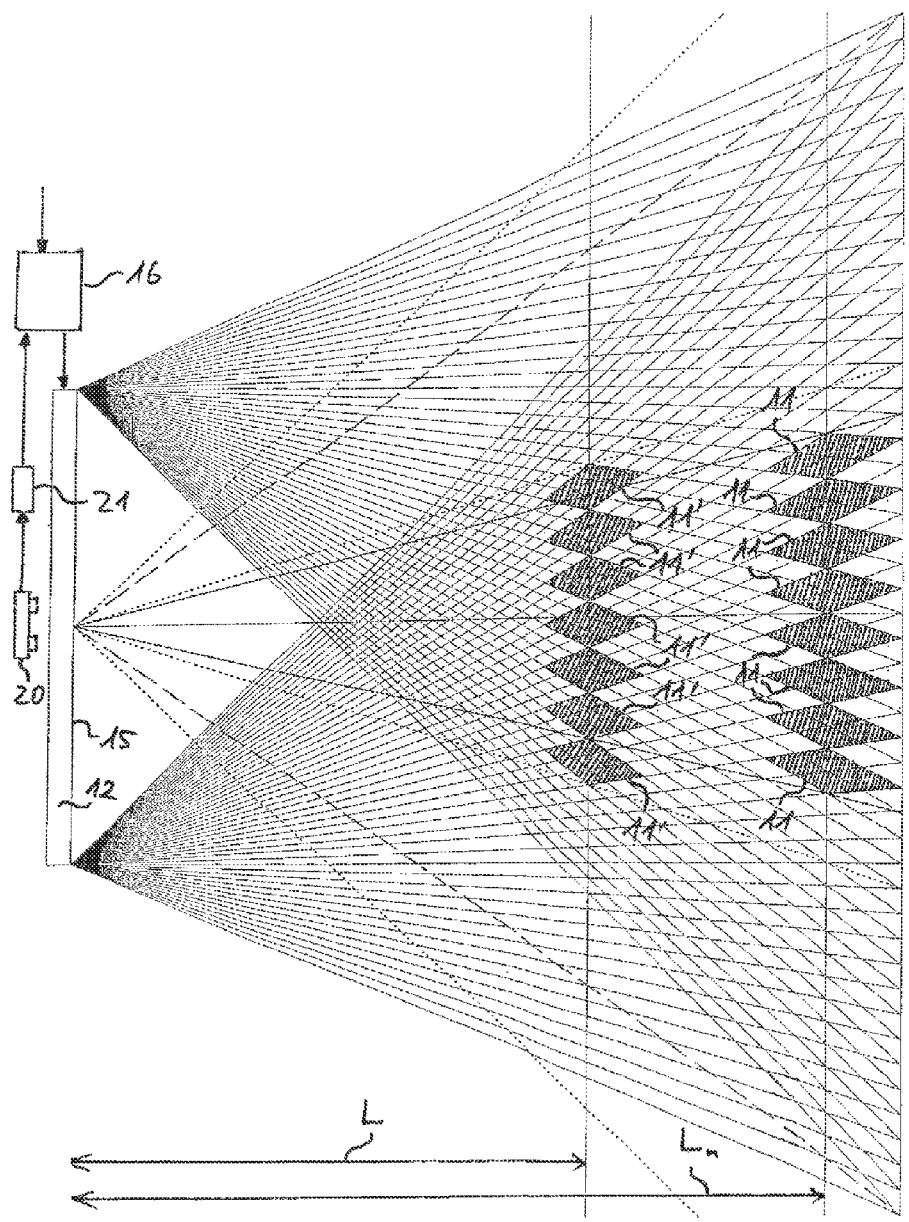

FIG. 5 in a representation according to FIG. 1, shows another screen which differs from the previously described screen only by way of the fact that the pixels 13 are smaller and arranged at a closer distance, so that the pixel matrix 12 has a higher resolution, wherein the electrodes 17 of the optical element 15 are accordingly also narrower and arranged next to one another at a narrower distance. Accordingly, the activation of the pixel matrix 12 and the optical element 15 by the suitably programmed control unit accordingly slightly differs from the previously described embodiments. In some embodiments, eight different stereoscopic half-pictures which in pairs complement one another into a three-dimensionally perceivable stereopicture, are reproduced on eight subsets of pixels, for a viewing of the screen from the nominal viewing distance $L_n$, wherein each of these subsets is formed by a family of bands of pixels 13, wherein the bands are formed in each case by two of the strips 14 of pixels 13 which are defined as previously.

Figure 6:
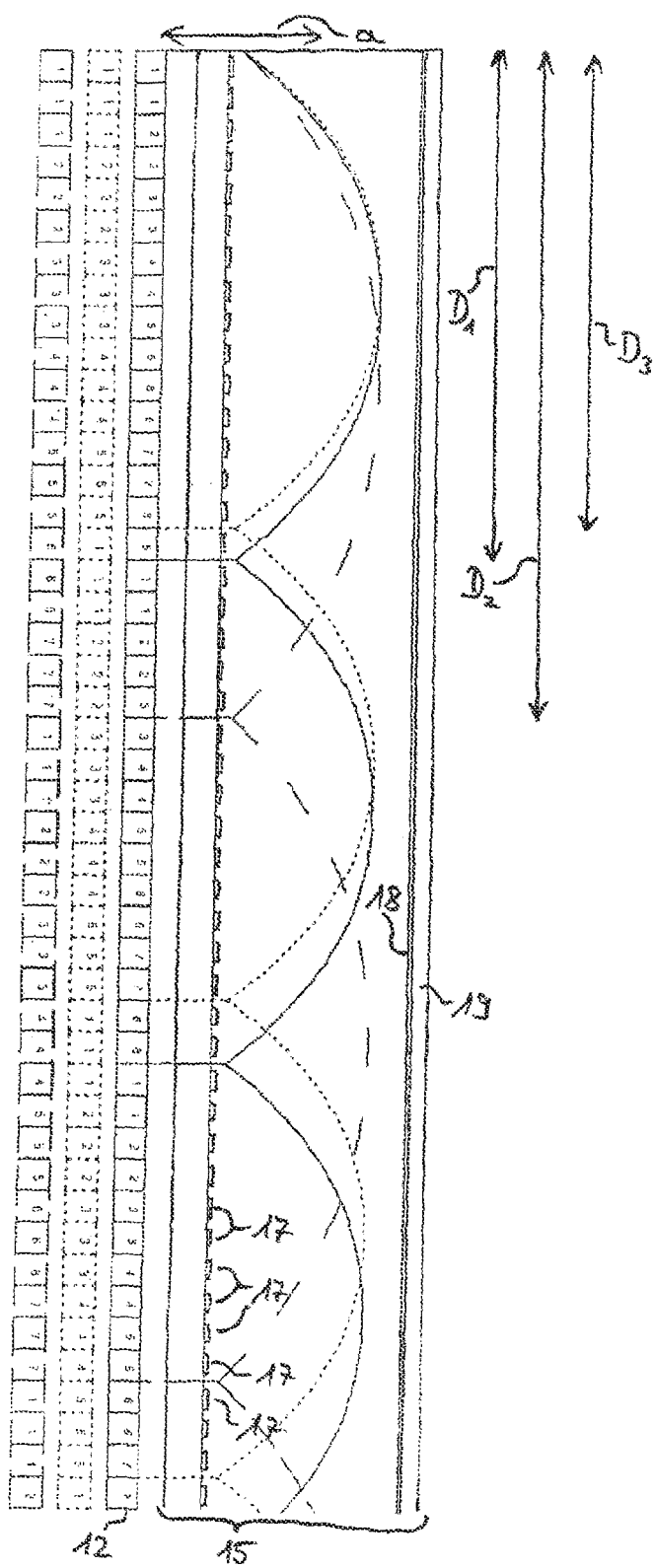

In FIG. 6, in a manner corresponding to FIG. 3, this activation of the pixel matrix 12 is illustrated with the example of a pixel line, as well as the activation of the optical element 15 which is selected in this case. The cylindrical-lens-like lenses which are formed by the optical element 15 in this case are indicated in FIG. 6 by unbroken lines. With a shortening of the viewing distance to a smaller value L, the activation of the pixel matrix 12 is changed such that only seven of the stereoscopic half-pictures are reproduced on according only seven subsets of pixels, wherein the bands of pixels 13 which form these subgroups, are widened and now are not only formed from two, but instead from three of the strips 14 of pixels 13. At the same time, the activation of the optical element is changed such that the period length of the lenticular lens formed by the optical element 15 is increased from $D_1$ to $D_2=(21/16) \times D_1$, wherein $D_1=16 \times D \times L_n/(L_n+a)$.

Alternatively, the screen may also be activated for a viewing from the shorter viewing distance L, such that only five stereoscopic half-pictures are reproduced on accordingly only five subsets of pixels 13, wherein these subsets again are formed from numerous bands of a width of three strips 14 in each case. In this case, the period length is reduced to the smaller value $D_3=(15/16) \times D_1$, which in FIG. 6, as also the respective distribution of picture information onto the pixels 13 of the represented pixel line, is illustrated by dotted lines.

Figure 7:
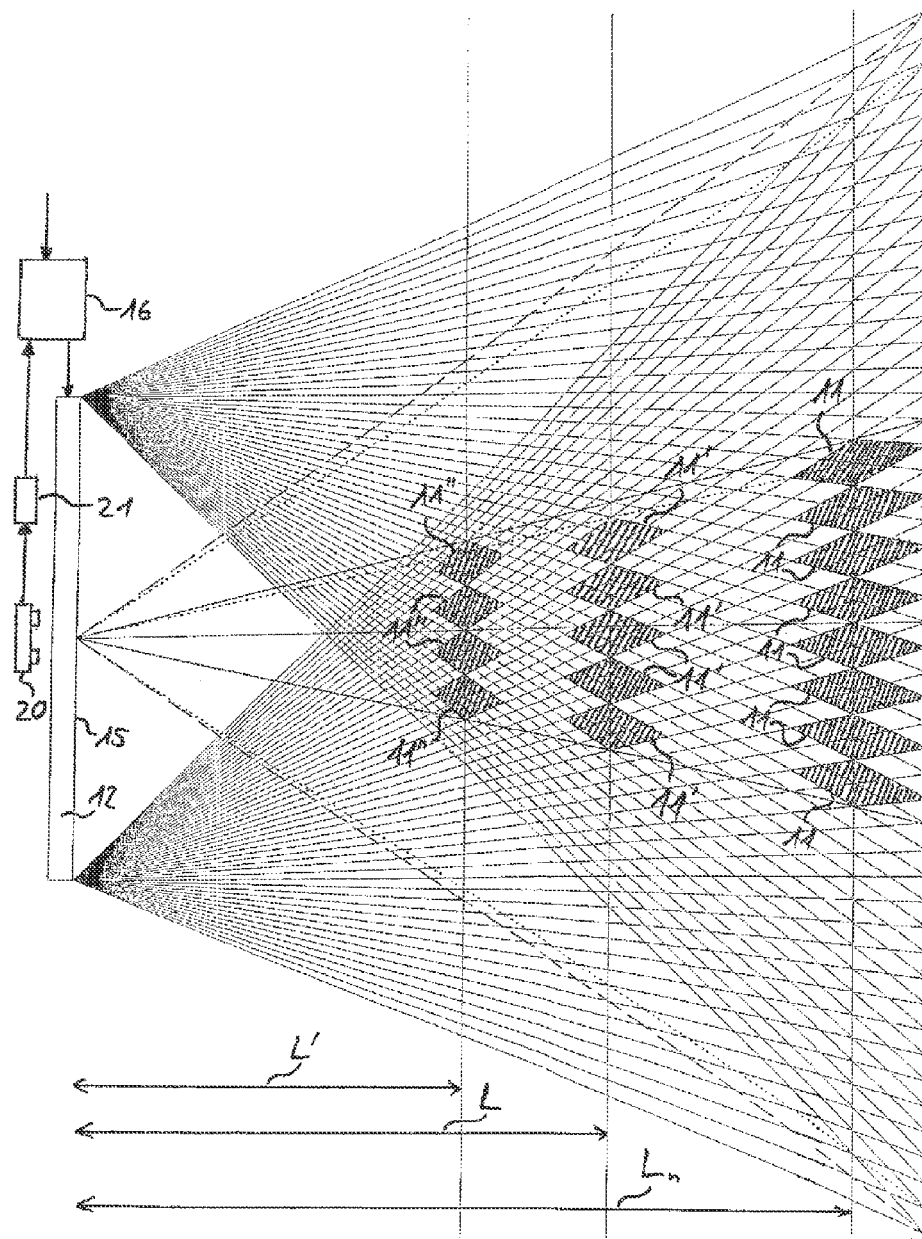

FIG. 7 shows how, with this activation for a viewing from the viewing distance L in the viewer space, the viewing zones 11' comes to lie in front of the screen. Additionally, it is also indicated in FIG. 7, as to how the screen may be activated for an even shorter viewing distance L'. The optical element for this is activated such that the period length of the optical grid again has the value $D_1$, wherein now only four subsets of pixels 13 for the reproduction of four stereoscopic half-pictures are defined such that each of these subsets is formed from a family of bands formed in each case by four of the strips 14.

The invention claimed is:

1. An autostereoscopic screen for the simultaneous reproduction of more than two different pictures, comprising a pixel matrix with a multitude of pixels, an optical element arranged in front of or behind the pixel matrix and a control unit for activating the pixel matrix,
   wherein the pixels of the pixel matrix are arranged in a multitude of parallel strips of pixels, the strips being vertical or inclined with respect to the vertical,
   wherein the optical element forms an optical grid with a family of strip-like structures running equidistantly next to one another and parallel to the strips, said grid in each case setting a defined propagation direction for the light departing from or transmitted by the pixels,
   wherein the control unit is configured to activate the pixel matrix in dependence on picture information of a plurality of stereoscopic half-pictures, such that each of these half-pictures is reproduced in each case on one of a corresponding number of subsets of pixels wherein each of these subsets is formed by a family of bands of pixels which are formed in each case by one or more of the strips, wherein the bands of the different subsets cyclically alternate in the horizontal direction, so that each of the stereoscopic half-pictures is visible at a viewing distance ($L_n$, L; L') in front of the screen, in each case from one of several laterally offset viewing zones, wherein a period length of the optical grid which is defined by a lateral offset of adjacent, strip-like structures, is changeable by way of activation of the optical element, wherein the optical element is activatable by the control unit, and the control unit is configured to carry out the following steps for a change of the viewing distance:
   enlarging or reducing the period length of the optical grid and
   redefining the mentioned subsets in a manner such that a width or an average width of the bands of pixels which form the subsets is changed by at least a width of one of the mentioned strips,
   so that a relative change of a lateral offset of the adjacent viewing zones is smaller than a relative change of the viewing distance, wherein the control unit is configured to increase the width of the bands forming the subsets for reducing the viewing distance and to reduce the width of the bands for increasing the viewing distance.

2. The autostereoscopic screen according to claim 1, wherein the control unit is configured, for the change of the viewing distance, to additionally increase or reduce the number of subsets and accordingly the plurality of reproduced stereoscopic half-pictures.

3. The autostereoscopic screen according to claim 1, wherein the control unit is configured to thereby define the subsets in each case such that all or a majority of the bands are formed in each case by an integer number of the strips of pixels which is equal for these bands, wherein the control unit is further configured to increase or to reduce this integer number for the change of the viewing distance and thereby to change the period length of the optical grid by a factor which corresponds to a ratio of a product of the number of subsets and the integer number after the change, to the product of the number of subsets and the integer number before the change.

4. The autostereoscopic screen according to claim 3, wherein the control unit is configured to thereby define the subsets in each case such that for a number of bands of pixels which corresponds to the number of subsets, there is on average less than one strip of pixels which is assigned to none of the bands or contributes to a width of one of the bands which differs from a width of the majority of the bands.

5. The autostereoscopic screen according to claim 3, wherein the optical element for activation comprises a family of electrodes running parallel to the strips, wherein the control unit is configured to activate the electrodes in each case with electrical command variables varying periodically from the left to the right, so that in each case a number of electrodes which corresponds to the product of the number of subsets and the integer number, forms a period.

6. The autostereoscopic screen according to claim 5, wherein one of the electrodes is assigned to each of the strips of pixels, wherein a lateral offset of adjacent electrodes is smaller than a lateral offset (d) of adjacent strips of pixels by a factor ($L_n/L_n+a$), wherein a indicates a distance between the pixel matrix and the optical grid, and $L_n$ a nominal viewing distance of the autostereoscopic screen.

7. The autostereoscopic screen according to claim 1, wherein the optical element is given by a liquid-crystal structure.

8. The autostereoscopic screen according to claim 1, wherein the optical grid is a lenticular lens, and the strip-like structures form cylindrical-lens-like lenses.

9. The autostereoscopic screen according to claim 1, wherein the optical element is a liquid-crystal lens system.

10. Autostereoscopic screen according to claim 1, wherein it comprises a device for detecting a distance of a viewer head or eye pair, to the screen, wherein the control unit is configured to activate the pixel matrix and the optical element such that the viewing distance corresponds to the detected distance, and to carry out the steps when a viewing distance exceeds or falls short of a threshold value.

11. The autostereoscopic screen according to claim 1, wherein the control unit is configured to fix the viewing distance in dependence on a manual input or an input signal and to carry out the steps when, by way of the input or the input signal, a change of the viewing distance is defined, by way of which the viewing distance exceeds or falls short of a threshold value.

12. The autostereoscopic screen according to claim 10, characterised in that for at least one integer k≥1 there is such a threshold value $L_k$ which is defined as $$L_k = L_n \times K^{-1} \times (1+v)/(k+1),$$

wherein $L_n$ indicates a nominal viewing distance of the autostereoscopic screen, K is a factor which is defined in that light departing from two adjacent strips of pixels, at the nominal viewing distance falls laterally offset by K×IPD through a viewing plane orientated parallel to the screen, wherein IPD is defined as the pupil distance of an average eye pair, and v a parameter which has a value of between 0 and 1, and wherein the control unit is configured, on falling short of this threshold value $L_k$, to increase a number of strips of pixels, from which all or a majority of the bands are formed in each case, from k to k+1, and on exceeding this threshold value $L_k$, to reduce the number of strips of pixels, from which all or a majority of the bands are formed in each case, from k+1 to k.

13. The autostereoscopic screen according to claim 1, wherein the control unit is configured to fix the number of subsets and accordingly the plurality of the reproduced stereoscopic half-pictures in dependence on a manual input or an input signal.

14. A method for the simultaneous reproduction of more than two different pictures on an autostereoscopic screen, which comprises a pixel matrix with a multitude of pixels and an optical element arranged in front of or behind the pixel matrix, wherein the pixels of the pixel matrix are arranged in a multitude of parallel strips of pixels, the strips being vertical or inclined with respect to the vertical, and wherein the optical element forms an optical grid with a family of strip-like structures which run parallel to the strips and equidistantly next to one another, said grid in each case setting a defined propagation direction for the light departing from or transmitted by the pixels, wherein a period length of the optical grid which is defined by a lateral offset of adjacent strip-like structures is changeable by way of activation of the optical element, wherein the method comprises activating the pixel matrix in dependence on picture information of a plurality of stereoscopic half-pictures in a manner such that each of these half-pictures is represented in each case on one of a corresponding number of subsets of pixels, wherein each of these subsets is formed by a family of bands of pixels which are formed in each case by one or more of the mentioned strips, wherein the bands of the different subsets cyclically alternate in the horizontal direction, so that each of the stereoscopic half-pictures is visible at a viewing distance in front of the screen, from in each case one of several laterally offset viewing zones and changing the viewing distance by way of increasing or reducing the period length of the optical grid and redefining the subsets in a manner such that a width or an average width of the bands of pixels forming the subsets is changed by at least a width of one of the strips, so that a relative change of a lateral offset of the adjacent viewing zones is smaller than a relative change of the viewing distance, wherein the width of the bands forming the subsets is increased for reducing the viewing distance or the width of the bands forming the subsets is reduced for increasing the viewing distance.

15. The method according to claim 14, wherein, for changing the viewing distance, additionally the number of subsets and accordingly the plurality of reproduced stereoscopic half-pictures is increased or reduced.

16. The method according to claim 14, wherein the subsets are thereby defined in each case such that all or a majority of the bands are formed in each case by an integer number of strips of pixels which is the same for these bands, and that this integer number is increased or reduced on changing the viewing distance and thereby the period length of the optical grid is changed by a factor which corresponds to a ratio of a product of the number of subsets and the integer number after the change of the viewing distance, to the product of the number of subsets and the integer number before the change of the viewing distance.

17. The method according to claim 16, wherein the subsets thereby are defined in each case such that for each number of bands of pixels which corresponds to the number of subsets, on average less than one strip of pixels which is assigned to none of the bands or contributes to a width of the one the bands which differs from a width of the plurality of the bands, remains.

* * * * *